Sept. 27, 1938.   P. V. JENSEN   2,131,438
BOTTLE CAPSULE AND PROCESS FOR MANUFACTURING THE SAME
Filed Feb. 18, 1935
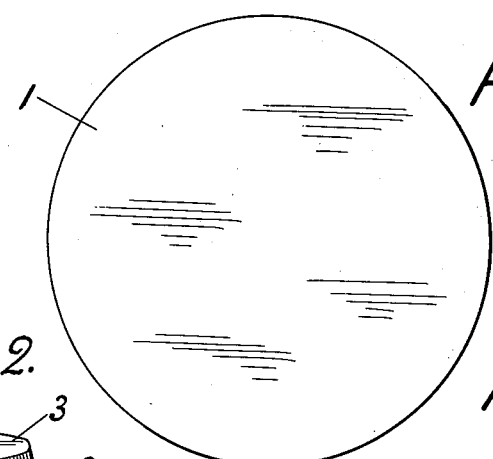
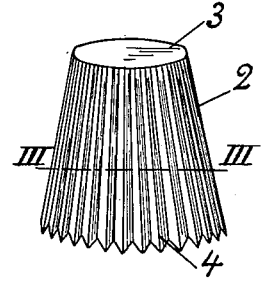
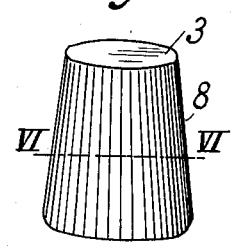
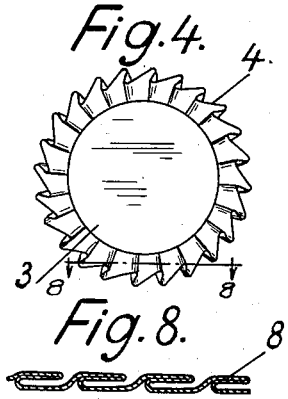
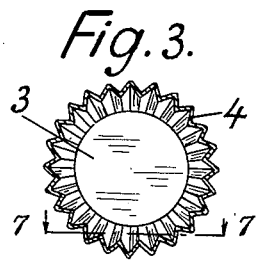
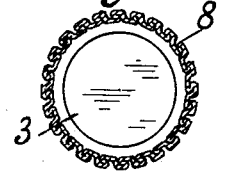
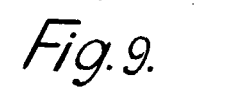
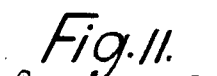
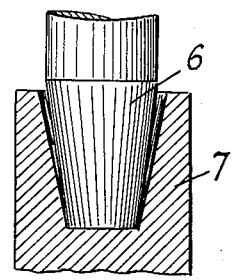
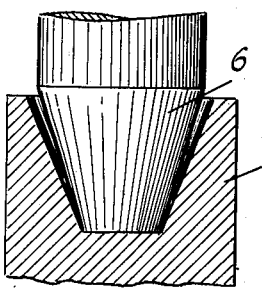
Poul Viggo Jensen
INVENTOR
By Otto Munk his ATTY.

Patented Sept. 27, 1938

2,131,438

UNITED STATES PATENT OFFICE 2,131,438

BOTTLE CAPSULE AND PROCESS FOR MANUFACTURING THE SAME

Poul Viggo Jensen, Hellerup, near Copenhagen, Denmark

Application February 18, 1935, Serial No. 6,981
In Sweden November 13, 1934

5 Claims. (Cl. 215—38)

For decoration of bottles and for protection of the bottle seal and the upper part of the bottle neck against dirt and moisture, and as a guaranty seal for the bottle stopper, cup-shaped bottle capsules of thin soft metal foil are affixed to the bottle neck by pressure.

The present invention relates to a new process for manufacturing such plastic cup-shaped bottle capsules from metal foil, and to the capsules manufactured according to the process.

It is known to manufacture such capsules with pleated sidewalls by shaping a blank of metal foil into cup-shape by radial folding.

The present invention has for its object, starting from such a bottle capsule of soft metal foil with wave-shaped side walls, the production of a bottle capsule with relatively smooth side walls and with considerable stiffness.

This is attained in that the wave shaped side walls of the capsule, after the folding, are pressed flat and formed by compression over a mandrel.

The capsules thus produced with the pleated sides pressed flat together offer many advantages over the known pleated capsules, for instance that they adhere more tightly to the bottle neck, that owing to their stiffness they remain straight during application to the bottle, that they are better able to resist pressure and blows, and that they occupy less space, and that the side walls have sufficient smoothness and firmness to be embossed with trade marks or the like.

On the drawing the invention is illustrated;

Fig. 1 shows a metal-foil blank for the manufacture of capsules,

Fig. 2 shows a pleated hollow body manufactured from the blank and forming an intermediate stage in the manufacturing process, in side elevation, Fig. 3 shows a section along the line III—III of Fig. 2 with isosceles folds, Fig. 4 shows a corresponding section of a construction with folds which are not isosceles, Fig. 5 shows the finished bottle capsule, in side elevation, Fig. 6 shows a section along the line VI—VI in Fig. 5, Fig. 7 shows a sectional view on a larger scale illustrating a portion of the side wall of the finished bottle capsule, made from the hollow body shown in Fig. 3, the section being taken on lines 7—7 thereof, Fig. 8 shows a sectional view taken on lines 8—8 of Figure 4, showing a portion of the capsule wall in a capsule made from the hollow body shown in Fig. 4, Figs. 9 and 10 show two tools for the manufacture, from the same hollow body, of capsules with different conicities, and Fig. 11 shows a capsule the bottom of which is reinforced.

According to the invention, the method of manufacturing the bottle capsules consists in making, from a thin metal foil a blank 1, which preferably may be of circular shape but also may be of any other shape, a hollow body which has a smooth bottom part 3 and side walls 2, which have pleated folds 4 extending from the bottom part 3 and down towards the edge of the capsule. As shown in Fig. 3, the pleated folds may be isosceles, so as to point mainly in radial direction from the axis of the hollow body or, as shown in Fig. 4, the folds may be oblique, so as to slant sideways. The hollow body 2, 3 produced in this manner is compressed between a mandrel 6, as shown in Figs. 9 and 10, and a corresponding matrix 7, in such a manner that the folds 4 are pressed flat, so that the capsule assumes the shapes shown in Figs. 5—8, inclusive, with a smooth bottom part 3 and smoothed side walls 8.

If the hollow body has isosceles folds as shown in Fig. 3, the smoothed folds in the finished capsule wall 8 will have the appearance shown in Fig. 7, whereas the smoothed folds assume the shape shown in Fig. 8, if the folds 4 in the hollow body are oblique.

The average wall thickness in the bottle capsule produced in this manner will increase from the bottom and downward to the free edge, as the quantity of material at each individual point of the side walls will increase proportionally with the distance from the center of the blank.

Owing to the increasing thickness of the capsule downward towards the free edge, the two pressing bodies should preferably have different conicites, and the conical cavity of the matrix must have a wider apex angle than the conical projection of the pressing mould, as shown in Figs. 9 and 10, in order to press the side walls as uniformly smooth as possible.

By adjustment of the conicity and shape of the pressing tool, bottle capsules with any desired conicity and shape may be produced in this manner, so as to fit the bottle necks desired to be closed.

It may be suitable to supply the initial material with an adhesive or lacquer on the side that is intended to form the inside of the capsule. Thereby it is attained that the folds on the inner side adhere together, whereby the stiffness of the sidewall is increased. In a corresponding manner the outside of the material before pressing may be supplied with adhesive or lacquer, and thereby also the outer side of the folds will adhere together, thus forming a capsule with perfectly coherent sidewalls.

The adhesive agent used on the inner side may suitably be of such a nature that the same, without the use of any solvent, will stick by mere pressure, and thereby the advantage is attained that the bottle capsule, merely by being compressed about the bottle neck, will stick to the same.

The bottom part 3 of the capsule and the top part of the side wall 8 are of a relative slight thickness. These parts may be reinforced by a blank 9, either on the inner side of the bottom or on the outside of the same, as shown with dotted lines in Fig. 11. It may be suitable, as also shown in Fig. 11, to shape this blank as a hood having a downward edge 10 covering the inner or outer side of the top part of the side wall 8. Such a reinforcing blank may be made from paper, metal foil or other suitable materials.

The material used for making the bottle capsule may be reinforced by one or more layers of paper, fabric or the like, the reinforcing layer being either applied to one side of the metal foil, and in that case the said layer may be used either as the inner or the outer side of the capsule, or it may be applied to both sides of the metal foil, and the reinforcement may be made in such a manner that metal foil is used on both sides of the reinforcing layer.

It is feasible, simultaneously with smoothing, to fit the capsule with pressed or printed inscriptions or marks, for instance by fitting the smoothing tool used in the bottom part or on the sides with corresponding stamps.

I claim:

1. A capsule made from a metal foil blank for application over the sealed end of a receptacle, said capsule comprising a relatively flat bottom or end portion and a depending skirt portion, said skirt having smoothly flattened, tapered pleats of superposed thicknesses of material extending longitudinally throughout the depth of the skirt, the pleats having their maximum width at the peripheral lower edge of the skirt, and terminating in the intersection of the closed end and the skirt.

2. A capsule made from a metal foil blank, for application over the sealed end of a receptacle, said capsule comprising a flat closed end portion and a depending skirt portion, said skirt having smoothly flattened, tapered pleats extending throughout the depth of the skirt, said pleats having their maximum width at and being disposed in abutting relationship around the peripheral lower edge of the skirt and terminating in the intersection of the closed end and the skirt, each pleat consisting of three thicknesses of the blank and being connected to its adjacent pleat by a single blank thickness.

3. A reinforced bottle capsule comprising a folded metal foil cup with a flat closed end and a depending skirt portion having pleats tapering off towards the closed end, and a sheet of reinforcing material covering at least a part of said skirt portion and being folded into the pleats of the latter, said pleats being smoothly flattened to interlock said metal foil capsule and reinforcing sheet.

4. The herein described method of making bottle capsules from metal foil blanks, which method comprises folding said blank and forming a flat closed end and a depending skirt portion with radially projecting tapering pleats having their maximum projections in the open end of the skirt and terminating in the intersection of the closed end and skirt, and finally smoothly flattening said pleats to abut each other around the peripheral edge at the open end of the skirt.

5. The herein described method of making reinforced bottle capsules from metal foil blanks, which method comprises covering parts of said blank with a sheet of pliable reinforcing material, then folding said blank and reinforcing sheet into each other and forming a flat closed end and a depending skirt portion with radially projecting tapering pleats having their maximum projections at the open end of the skirt, and finally smoothly flattening said pleats to interlock firmly the pleats of the blank with those of the reinforcing sheet.

POUL VIGGO JENSEN.